United States Patent Office 3,504,523
Patented Apr. 7, 1970

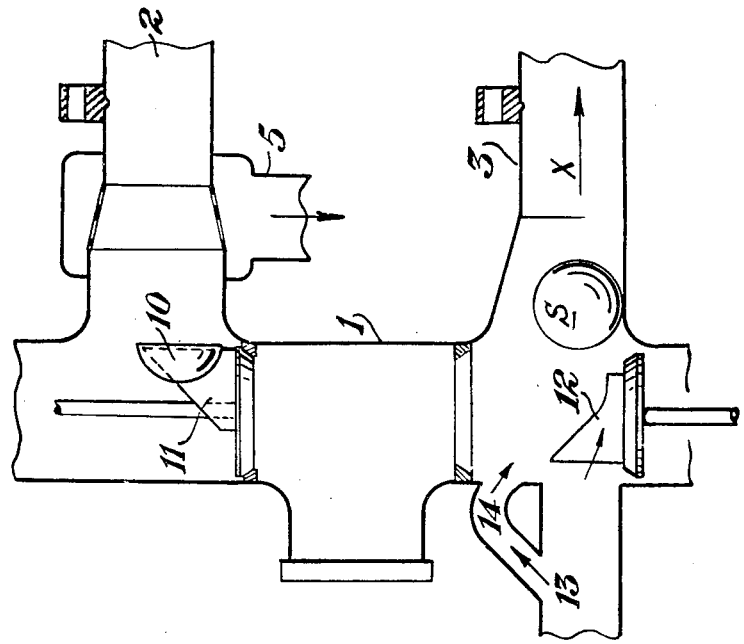
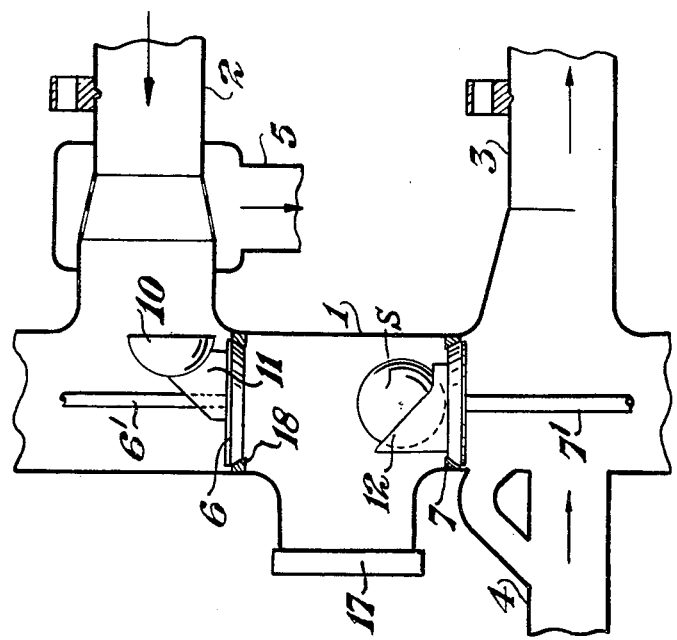

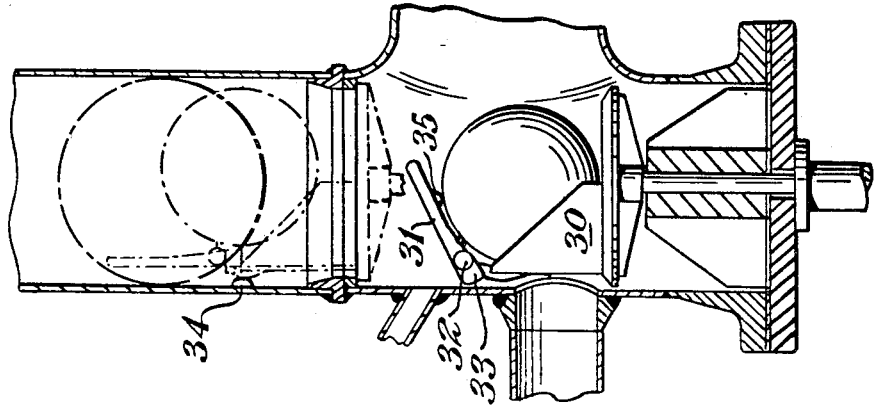
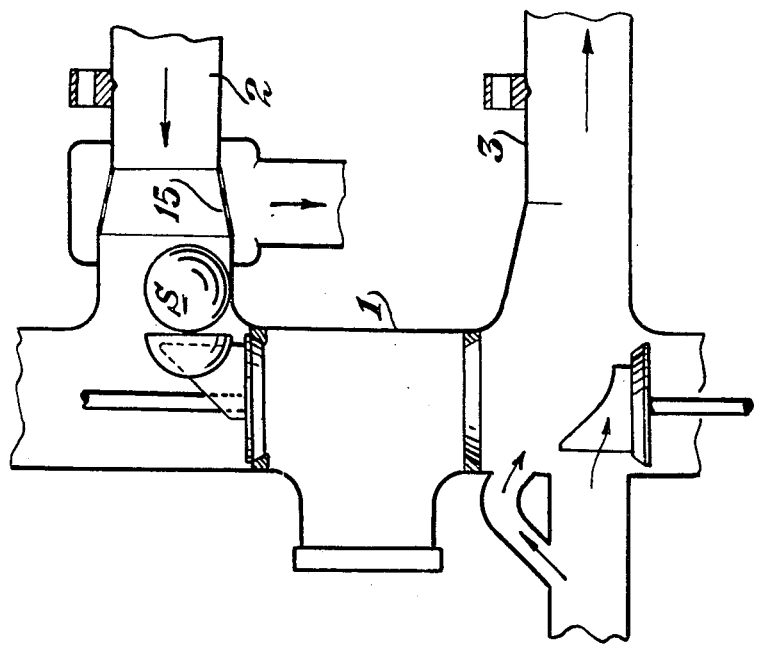

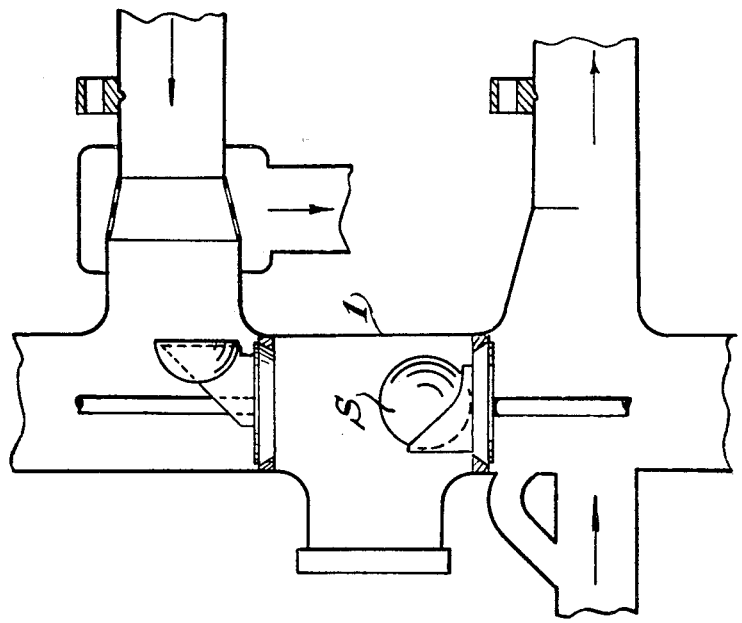
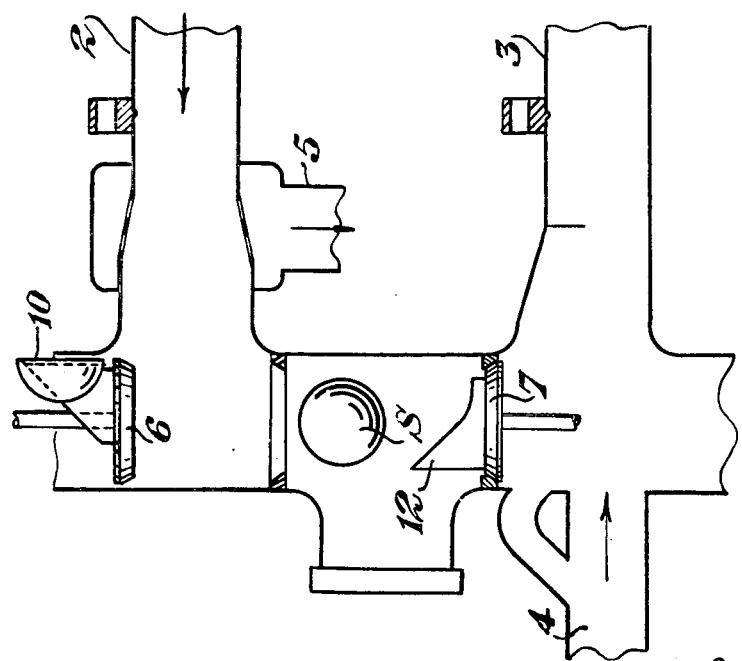

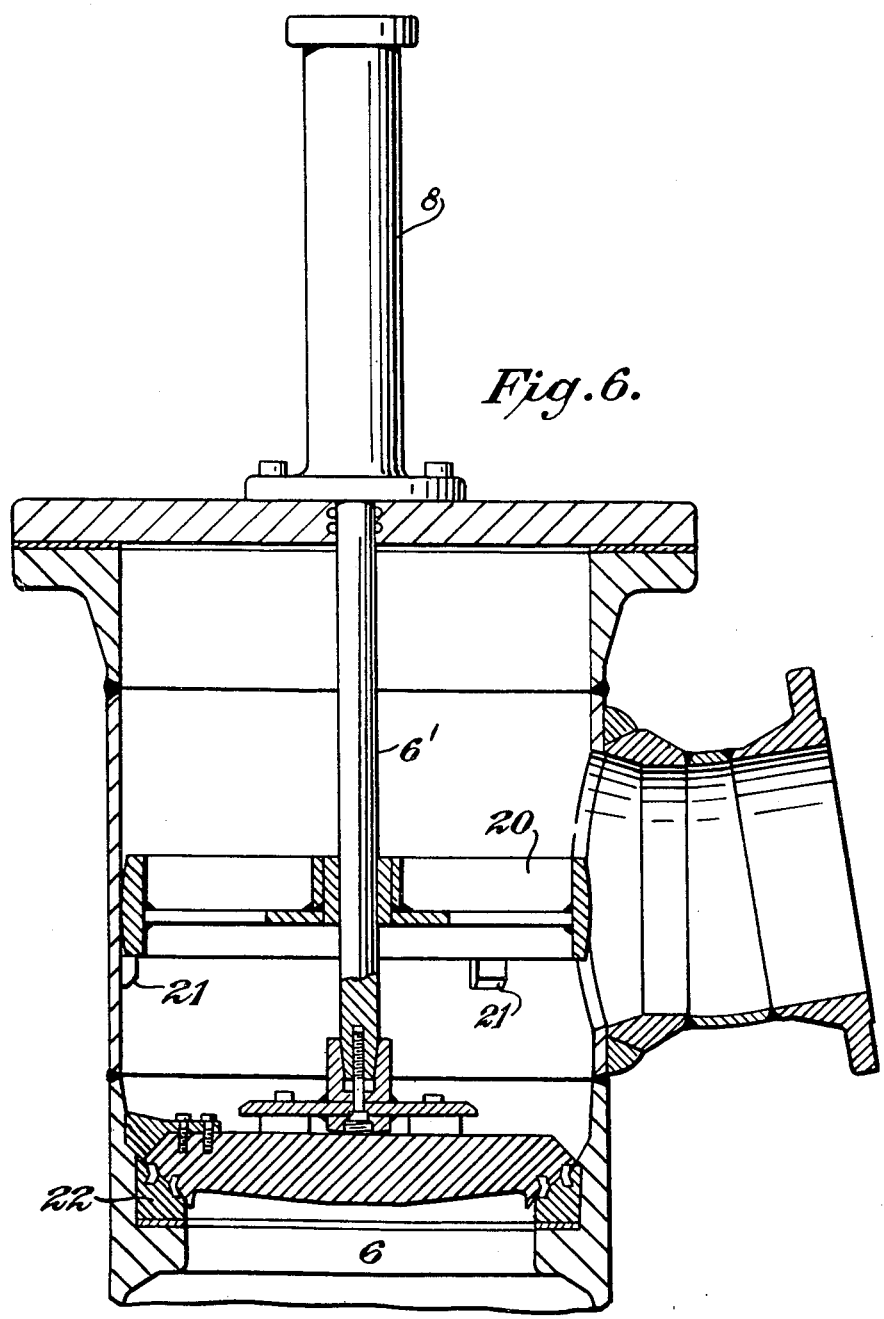

3,504,523
UNIDIRECTIONAL METER PROVERS
Michael Layhe, Sheffield, England, assignor to General Descaling Company Limited, Worksop, England, a corporation of the United Kingdom
Filed Dec. 14, 1967, Ser. No. 690,463
Claims priority, application Great Britain, Dec. 22, 1966, 57,458/66
Int. Cl. G01f 25/00
U.S. Cl. 73—3                             15 Claims

ABSTRACT OF THE DISCLOSURE

The meter proving apparatus of this invention comprises an interchange section at the terminal ends of the proving loop passage of the sphere or plug through said section being controlled by means of poppet type valves associated with each of which is a stop device to arrest movement of and support the sphere or plug.

---

This invention relates to meter proving apparatus.

In pipe lines for transporting liquids, where flow-meters are used to measure the volume of fluid passing, it has been found desirable to introduce a meter proving section upstream or downstream of the flow meter to be calibrated. The unidirectional meter proving section necessitates the provision of an interchange pipe down or along which the sphere travels, since when a sphere has completed its passage through the calibrated loop of such a uni-directional prover, it is necessary to remove it from the flowing liquid stream, to control its passage along the interchange by means of a valve system, and to prepare it for launching once again at the upstream end of the loop. The upstream end of the loop is naturally at a slightly higher pressure than the downstream end, due to the friction losses in the loop. The accepted technique is to bring the downstream end physically above the upstream end, and to arrange the valve function so that the sphere may be allowed to fall without at any time permitting a free liquid communication through the interchange.

To permit gravity fall of the sphere, the interchange pipe is usually made several sizes larger than the actual loop size. One accepted technique is to use two conventional valves in the interchange section. These are operated in such a way that only one is opened at any one time, thus constituting a transfer lock.

When both valves are closed it is possible to open the centre section by means of a suitable hatch to insert or remove a sphere from the system. An alternative technique shown in specification No. 936,646 is to use a blind ball valve. This, in one unit, enables the ball to be received, transferred and launched, and by stopping at an intermediate position also provides a load and unload facility.

Such ball valves have proved in practice to be very sensitive to pipeline debris, and they necessitate elaborate protective means. They are also extremely costly. The use of two separate valves as first mentioned, can also be very costly.

Both systems do nothing to improve the ease of launching of the sphere. At high velocities this can be difficult since the sphere tends to rotate upon the vortices instead of entering the flowing stream. It is usually necessary to make the lower T section much larger than the pipeline to reduce velocities sufficiently to ensure good results. Similarly, the upper separating T has to be made of generous proportions, and may require special fittings as depicted.

The present invention is concerned with the interchange pipe and has for its object an improved valve control system.

According to the present invention in meter proving apparatus comprising an interchange pipeline or section, movement of the sphere or other plug is controlled by means of poppet type valves capable of axial displacement to and from predetermined positions in the pipeline to admit and release the sphere from the interchange.

Preferably the poppet valves are movable into and out of positions in register with spaced upper and lower valve seatings in the interchange.

Means is provided for effecting valve actuation conveniently by hydraulic rams and the operating sequence may then be made completely automatic. Alternatively, the valves can be operated by screw or other mechanisms either by hand or power operation; for manual operation interlocks of conventional form may be arranged to prevent both valves being lifted from their seats simultaneously, the sequence of valve movements being essential to the operation.

According to a further feature of the invention the valves are provided with a stop device for arresting movement of and/or locating a sphere when stationary, e.g. prior to launching. The stop device may take the form of a semi-spherical cup or seating shaped to conform to the sphere or plug, the position of the cup being angularly located in relation to the path travelled or to be travelled by the sphere.

The invention is illustrated in the accompanying drawings as applied to a meter prover having a vertically extending inter change pipe.

FIGURES 1–5 are diagrammatic views showing different stages in the operation of the valves in their relation to the proving loop and to an unload and load hatch;

FIGURE 6 is a detail section showing a buffer or support ring for the upper or master valve;

FIGURE 8 is a detail section of a valve provided with a latch mechanism.

Figure 7:
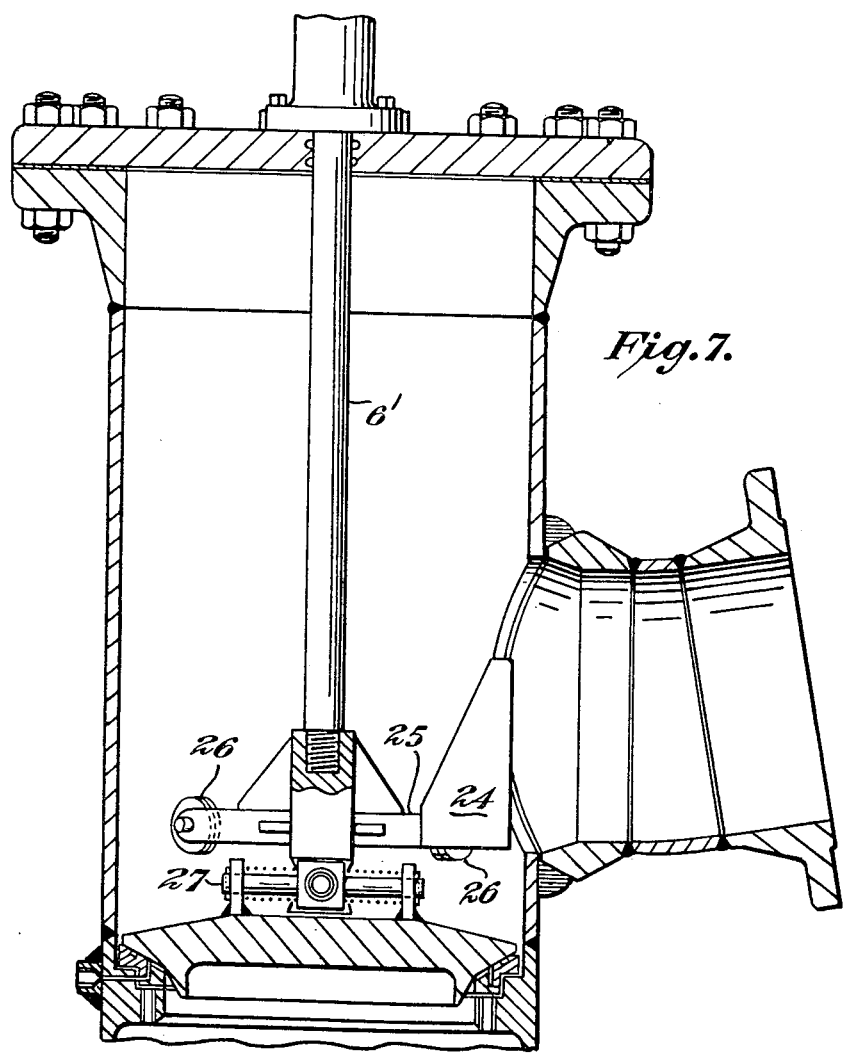
FIGURE 7 is a detail section showing a modified form of buffer or stop for the sphere and a valve which is self aligning.

In the drawings 1 indicates an interchange section connecting the ends of a calibrated loop of a uni-directional prover, the downstream and upstream ends of the pipes of which are indicated respectively at 2 and 3, the main pipeline being indicated at 4. Access to the section 1 is by means of a detachable hatch 17.

In the embodiment illustrated, the downstream end 2 is above the upstream end 3 and the interchange section 1 is shown extending vertically but it will be understood that the axis of the pipe need not be completely vertical and may be inclined at any angle sufficient to allow the sphere to roll from top to bottom. 5 indicates a separating T.

In the meter proving apparatus of this invention, a poppet type valve, of which there are two, indicated respectively at 6 and 7, is provided for controlling movement of the sphere or plug indicated generally at S through the section, the two valves being capable to axial displacement to and from the closed positions shown in FIGURE 1 to admit and release the sphere S from the interchange as hereinafter described. For this purpose each valve head is integral with a valve spindle which are indicated respectively at 6' and 7'.

It will be understood, however, that valve actuation may be by means of hydraulic rams, one such ram being indicated at 8 in FIGURE 6. The operating sequence may then be made completely automatic. Alternatively, the valves can be operated by screw or other mechanisms either by hand or power operation; for manual operation interlocks of conventional form may be arranged to prevent both valves being lifted from their seats simultaneously, the actual sequence of valve movements being essential to the operation.

A stop device is provided for arresting movement of the sphere on leaving the downstream end of the pipeline 2 and for supporting and locating the sphere in movement through the transfer section. The stop means may consist of a semi-spherical cup 10 supported by a bracket 11 which is attached to the upper side of the valve 6. It will be seen that the position of the cup is angularly located in relation to the path travelled by the sphere, the axis of the cup 10 in this case being parallel to that of the pipeline. For the lower valve 7 the stop device consists of a cup 12 directly mounted on the valve head, the open side of which is at an angle to the horizontal so that discharge of the plug, when being re-launched into the pipeline 3, is facilitated.

In FIGURE 1 the sphere S is shown in position in the stop cup 12 prior to re-launching. To re-launch it the valve 7 is withdrawn downwardly from its closed position on its seating to a position below the pipeline level as shown in FIGURE 2 when, due to the fact that the sphere is in the stream of liquid, it will be propelled forwardly in the direction of the arrow X. It will be noted that the upper valve 6 remains closed. To facilitate launching, the main inlet at 13 has a branch line 14 so that liquid directly strikes against the side of the sphere to lift it off its cup. The main inlet, being partially obstructed by the shroud, encourages flow to pass through branch line 14 so that liquid is directed against the sphere to assist its movement into the loop.

FIGURE 3 shows the sphere at the end of the loop prior to encountering the stop 10, the valve 6 being in its closed position. At the completion of its run the sphere, having left the liquid which passes down the separating T5, continues its forward path, in which it is assisted by a sloping section 15. The sphere having been arrested, valve 6 is raised to allow the sphere to drop into the interchange section 1 as shown in FIGURE 4 until once again it is seated in the cup 12 (FIGURE 5).

In the apparatus of this invention there is the advantage that since both valves are closed when the sphere is to be loaded or unloaded through hatch 17, the line pressure then assists in holding both valves 6 and 7 firmly against their seats. As the lower valve 7 is concerned with the launching it remains open during a run and does not move. At this time the piston rod 7' is withdrawn and stationary with the advantage that piston rod volume is not added to or subtracted from the flowing stream which is being measured. It also ensures that the sealing requirements for the lower valve 7 are not so stringent since it takes no part in the high accuracy performance. The upper or master valve 6 may be considered as almost continually closed, opening only briefly for the passage of the sphere and immediately re-closing. For this reason the master valve 6 is preferably provided with twin seals with means of venting the interspace to establish drop-tight closure, one such arrangement being shown in FIGURE 6.

It should be understood that the two loop connections need not necessarily be in the same plane and may also be in various vertical angles. The inlet connections are preferably approximately opposite to the loop entrance but the loading position, i.e. loading and unloading hatch 17, for the sphere may be at any radial location.

Conveniently, both valves 6 and 7 in their closed positions are located by conical seatings 18. It will be understood, however, that while this is a preferred construction, the seals may be made by piston type valves or by the mating of flat surfaces.

It is, however, desirable that the upper valve has two sealing mechanisms with means of communicating the inter-seal space in section 1 to the outside.

The use of the separation T is a preferred form but it is possible to have layouts where the sphere separates in an oversized section, arriving at the upper valve by gravity.

Referring to FIGURE 6 there is shown an alternative form of stop device comprising a ring member 20 slidably carried on the valve spindle 6' and which, in its operative position, is located by means of lugs 21 on the wall of the valve casing. This has the advantage that the impact of the oncoming sphere is taken by the valve casing instead of by the valve head, the ring 20 being lifted out of the way as the valve head moves upwardly off its seating 22. 23 is one of three locating stops or lugs secured to the upper face of the valve head.

FIGURE 7 shows a further alternative in which the stop device consists of a plate 24, which may have a spherical or arcuate recess to receive the sphere S, carried by a bracket 25 secured to the end of the valve spindle 6'. 26 are guide rollers mounted on radial arms for contact with the surface wall of the valve casing. In this arrangement the valve head is hingedly attached by means of a hinge pin 27 to the valve spindle. Alternately it may be connected to the spindle by means of a resilient coupling.

In the arrangement shown in FIGURE 8 in order to reduce resistance to ball movement when launching, the valve head is provided with a back-stop 30 and a form of mechanical restraint holds the sphere in position as the valve descends through the intersection to the launching position. For this purpose there is provided a hinged latch device comprising a two armed lever 31 pivotally mounted at 32 on the back-stop 30, one arm 33 of which co-operates with spaced pins 34, 35, the upper pin operating to move the arm 31 to the dotted line position shown so that it will not interfere with the sphere when falling onto the valve head 6.

As the latch and the valve move away from this position the latch restrains the sphere, continuing to do so until the assembly reaches the launch position, when a second fixed pin 35 removes the effect of the latch from the sphere and allows the flowing stream to take effect as previously described. It will be seen that although this involves an additional simple mechanism no power or control is required, the linear valve movement being sufficient.

What is claimed is:

1. A meter proving apparatus comprising a pipeline including a continuous loop having substantially horizontal end sections and an interchange section interconnecting the end sections of said loop, a portion of said pipeline being positioned for directing fluid toward one of said end sections, said interchange section having an outlet adjacent said one end section and an inlet adjacent the other of said end sections, first and second valve means respectively normally closing said inlet and outlet to prevent the passage of a sphere therethrough, means for selectively moving said first and second valve means to open and close said inlet and said outlet, and means carried by the second valve means at said outlet for mechanically positioning a sphere ajacent said pipeline portion and said one end section whereby the fluid from said pipeline portion effects the launching of the sphere into said one end section.

2. The meter proving apparatus as defined in claim 1 including means associated with at least one of said first and second valve means for locating a sphere prior to the movement of said at least one valve means toward an open position thereof.

3. The meter proving apparatus as defined in claim 1 wherein said first and second valve means are poppet valve elements.

4. The meter proving apparatus as defined in claim 1 wherein said first and second valve means are poppet valve elements, and said poppet valve elements are each moved by said moving means in a direction toward said pipeline portion and said one end section for opening said respective inlet and said outlet.

5. The meter proving apparatus as defined in claim 3 wherein each poppet valve element comprises a valve head and a valve seat in the interchange section, and each valve head carries means for locating a sphere prior to the movement of the poppet valve elements in a direction to open said inlet and said outlet.

6. The meter proving apparatus as defined in claim 3 wherein each poppet valve element comprises a valve head and a valve seat in the interchange section, and each valve head has a cup-shaped stop adapted to support a sphere.

7. The meter proving apparatus as defined in claim 6 in which the stop at the inlet of the interchange section comprises a hemisphere arranged at right angles to the axis of said other end section.

8. The meter proving apparatus as defined in claim 6 in which the stop at the outlet of the interchange section comprises a hemisphere arranged at an angle of 45 degrees to facilitate launching.

9. The meter proving apparatus as defined in claim 2 wherein said one valve means is a poppet valve element having a valve seat in the interchange section and a valve spindle having a valve head movable into and out of engagement with the seat, and said locating means is movably carried by said valve spindle.

10. The meter proving apparatus as defined in claim 9 including means in said interchange section for limiting the movement of said locating means in a direction toward said inlet.

11. The meter proving apparatus as defined in claim 10 wherein said locating means is a stop ring carried by said spindle.

12. The meter proving apparatus as defined in claim 1 wherein one of said first and second valve means includes a valve head and valve spindle, means pivotally attaching said valve head to said valve spindle, and means carried by said spindle for locating a sphere prior to the movement of said one valve means in an opening direction.

13. The meter proving apparatus as defined in claim 1 including means for retaining a sphere upon said second valve means during the movement thereof toward said pipeline portion and said one end section.

14. The meter proving apparatus as defined in claim 13 wherein said retaining means is a latch device comprising a lever arm for movement into and out of engagement with a sphere, and means carried by said interchange section for interengagement with said arm whereby on movement of said one valve means toward said outlet said lever arm is automatically moved out of latching engagement with the sphere.

15. The meter proving apparatus as defined in claim 1 wherein said pipeline portion is bifurcated to define two fluid passages one above the other, and said second valve means is movable to a position at which fluid from said one passage is directed toward a sphere positioned by said positioning means between another fluid passage and said one end section.

References Cited

UNITED STATES PATENTS

| | | | |
|---|---|---|---|
| 3,322,140 | 5/1967 | Scott | 137—268 |
| 3,224,247 | 12/1965 | Barrett | 137—268 XR |
| 3,246,666 | 4/1966 | Park et al. | 137—268 |

M. CARY NELSON, Primary Examiner

J. MILLER, Assistant Examiner

U.S. Cl. X.R.

137—268.